No. 772,571. PATENTED OCT. 18, 1904.
H. P. MAXIM, H. M. POPE & H. W. ALDEN.
ELECTRIC MOTOR VEHICLE.
APPLICATION FILED SEPT. 24, 1897.
NO MODEL. 8 SHEETS—SHEET 1.

Attest:
A. N. Jeskira
F. M. Eggleston.

Inventors:
Hiram Percy Maxim
Harry M. Pope and
Herbert W. Alden
by Redding, Kiddle & Greeley
Attys.

No. 772,571. PATENTED OCT. 18, 1904.
H. P. MAXIM, H. M. POPE & H. W. ALDEN.
ELECTRIC MOTOR VEHICLE.
APPLICATION FILED SEPT. 24, 1897.
NO MODEL. 8 SHEETS—SHEET 3.

No. 772,571. PATENTED OCT. 18, 1904.
H. P. MAXIM, H. M. POPE & H. W. ALDEN.
ELECTRIC MOTOR VEHICLE.
APPLICATION FILED SEPT. 24, 1897.
NO MODEL. 8 SHEETS—SHEET 4.

No. 772,571. PATENTED OCT. 18, 1904.
H. P. MAXIM, H. M. POPE & H. W. ALDEN.
ELECTRIC MOTOR VEHICLE.
APPLICATION FILED SEPT. 24, 1897.
NO MODEL.
8 SHEETS—SHEET 5.

Attest:
A. N. Jesbra.
F. M. Eggleston.

Inventors:
Hiram Percy Maxim
Harry M. Pope and
Herbert W. Alden
by Redding, Kiddle & Greeley
Attys.

No. 772,571. PATENTED OCT. 18, 1904.
H. P. MAXIM, H. M. POPE & H. W. ALDEN.
ELECTRIC MOTOR VEHICLE.
APPLICATION FILED SEPT. 24, 1897.
NO MODEL. 8 SHEETS—SHEET 8.

Fig. 19.

Attest:
Inventors:

No. 772,571.

Patented October 18, 1904.

UNITED STATES PATENT OFFICE.

HIRAM PERCY MAXIM, HARRY M. POPE, AND HERBERT W. ALDEN, OF HARTFORD, CONNECTICUT, ASSIGNORS, BY MESNE ASSIGNMENTS, TO MORTON TRUST COMPANY, TRUSTEE, A CORPORATION OF NEW YORK.

ELECTRIC MOTOR-VEHICLE.

SPECIFICATION forming part of Letters Patent No. 772,571, dated October 18, 1904.

Application filed September 24, 1897. Serial No. 652,858. (No model.)

*To all whom it may concern:*

Be it known that we, HIRAM PERCY MAXIM, HARRY M. POPE, and HERBERT W. ALDEN, citizens of the United States, and residents of the city and county of Hartford, State of Connecticut, have invented certain new and useful Improvements in Electric Motor-Vehicles, of which the following is a specification, reference being had to the accompanying drawings, forming a part hereof.

This invention relates especially to electrical appliances pertaining to the propulsion of motor-vehicles of the general character and description of those shown and described in applications for Letters Patent of the United States of Hiram Percy Maxim, filed June 3, 1896, Serial No. 594,058, and May 3, 1897, Serial No. 634,841, and has for its particular object the improvement of such appliances with reference to the requirements of their use in such vehicles; but nevertheless the improvements to be described hereinafter may be applied in whole or in part to other particular uses than that referred to, and consequently, except as hereinafter indicated, our invention is not to be restricted to the particular use referred to.

One purpose which we have had prominently in view has been the production of apparatus which can be operated, managed, and cared for by inexperienced and even unintelligent persons without danger of injury to themselves or to others or to the apparatus or to the vehicle to which it may be applied, and we have also sought to overcome as far as possible all of the defects in other apparatus of like general nature so far as they have become known to us.

In part our invention relates to the system of wiring or connections between the storage battery or other source of electrical energy and the motor and their adjuncts; in part to the means for connecting various portions of the electrical apparatus and for connecting the storage battery when employed to the supply-cable with a view to guarding against the possibility of improper connections; in part to the provisions for recharging with a view to effecting automatically the interruption of the supply when the batteries are fully charged; in part to the controlling devices with a view to enabling the speed of the motor, and therefore of the vehicle, to be regulated easily and quickly, as required, and also with a view to preventing the accidental reversal of the motor or current, and in part to the general perfection of the apparatus in various details.

The several features of our invention will be more particularly described hereinafter with reference to the accompanying drawings, in which—

Figures 1, 20, 21, 22, 23:
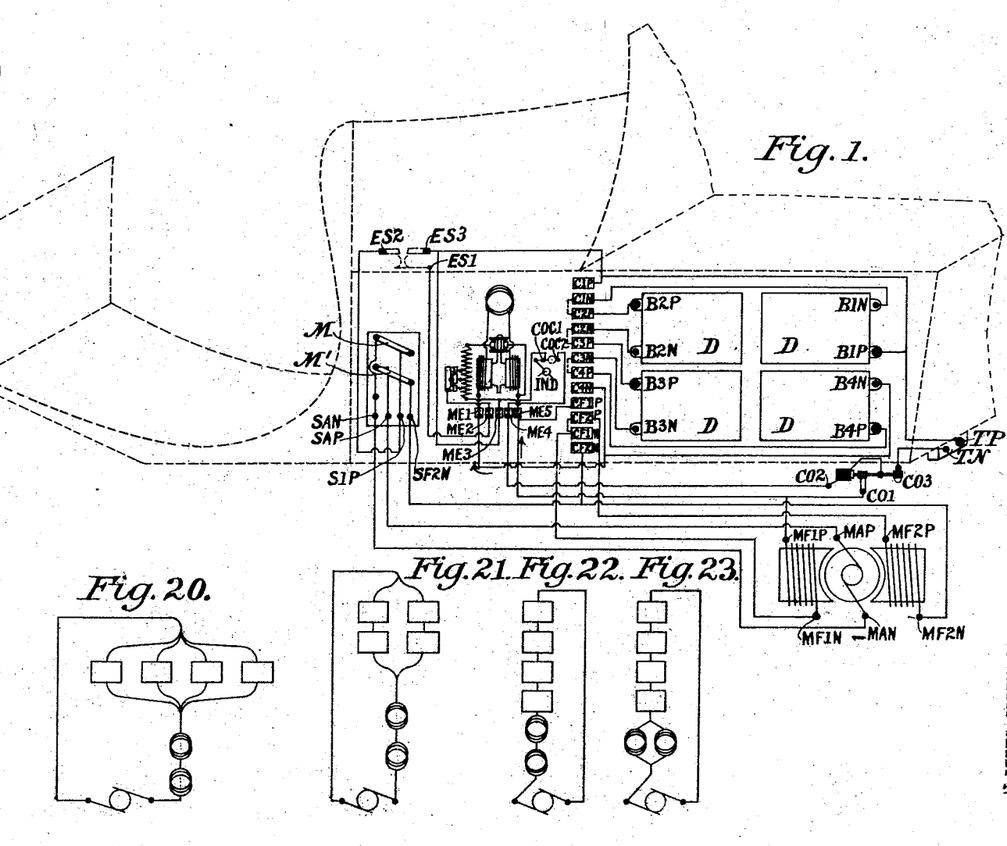
Figure 1 is a diagrammatic representation of the various electrical connections, the body of a suitable vehicle being represented in dotted lines to show the general relation of the electrical connections with respect thereto.
Figs. 20 to 23 are diagrammatic views showing the connections of the battery to the motor for different speeds.

In order to enable the relations of the various parts of the apparatus to be more readily understood, we will first describe the general arrangement or system of electrical connections, referring particularly to Fig. 1, in which such connections are represented diagrammatically and conventionally, and for convenience some of the parts referred to will be identified by the initial letters of the names of such parts or in a similar manner. The positive and negative charging-terminals are represented, respectively, at TP and TN. From the positive terminal TP suitable connections are provided for the passage of the current through the four battery-boxes which are indicated in the drawing. The several connections both of the controller and of the boxes being suitably indicated at B1P, (box 1 positive,) B1N, (box 1 negative,) C1N, (controller 1 negative,) C2P, B2P, B2N, C2N, C3P, B3P, B3N, C3N, C4P, B4P, B4N, (box 4 negative.) From B4N a connection is continued through C4N and by a branch to ME1, which is the first binding-post of the recording-wattmeter. From ME1 the circuit is continued through the coils of the ammeter to ME5 or binding-post 5 of the wattmeter and thence to CO1 (cut-out 1) of the automatic cut-out switch over the blade of the switch to CO3, and so to negative charging-terminal TN. The wattmeter need not be described in detail herein, since its construction and arrangement form no part of our present invention and may be as usual or preferred; but the pointer or indicator IND thereof is arranged to operate or to act as a circuit-closer to complete a shunt-circuit when the pointer or indicator has moved to its extreme position, indicating that the required amount of current has passed and that the battery is fully charged. This shunt-circuit is derived from a branch from the positive terminal TP, which enters the wattmeter at ME3 and has two branches, the right-hand branch passing to the cut-out contact COC1, from which the shunt-circuit is completed by the indicator IND to cut-out contact COC2, and thence by ME4 to CO2 and through the magnet there represented to the blade of the knife-switch, and so to the negative charging-terminal TN; but as the magnet is energized the blade of the switch is released and the circuit is broken, interrupting the current-supply to the battery, as well as the shunt, through the meter from COC1 to COC2.

The left-hand branch from ME3 of the shunt-circuit above mentioned is carried through a suitable resistance and thence through the volt-meter and meets the main circuit from the ammeter at ME5, the circuit being completed to TN through CO1 and CO3 of the cut-out switch. When the vehicle is in readiness for use, current is also supplied to the armature of the wattmeter from the emergency-switch, hereinafter referred to, by a branch from ES1 to ME2 and thence to the volt-meter through the resistance above referred to.

Except for the branch last above described the conections previously referred to are operative during the charging of the battery. The connections which become operative during the discharging of the battery and the operation of the motor will now be described, it being premised that by the operation of the controller the several boxes of the battery can be coupled up in parallel or with two boxes in series and the two sets in parallel or with the four boxes in series and that the two fields of the motor can be coupled up in series or in parallel, according to the speed desired. Assuming that the current starts from B1P, its course may be traced through the contacts ES3 and ES2 of the emergency-switch and thence to the reversing-switch, which in going ahead it enters at S1P and leaves at SAN, whence it passes to MAN, which is the negative terminal of the motor-armature. From MAP, which is the positive terminal of the motor-armature, it returns to the reversing-switch at SAP, leaving again at SF2N. Thence it passes to MF2N, which is the negative terminal of one field of the motor. From the positive terminal MF2P of the same field it passes through the controller at CF2P and CF1N to the negative terminal of the other field at MF1N. From the positive terminal MF1P of the same field it passes to the wattmeter at ME5 and over the coils of the same in the reverse direction from the charging-current, thereby reversing the movement of the indicator and showing what quantity of electrical energy remains in the battery to ME1, and thence back to the battery at B4N, while the desired connection of the battery-boxes in the circuit from B4N to B1P is effected by the controller. It is obvious that the shifting of the reversing-switch will send the current through the armature of the motor in the reverse direction, thereby reversing the direction of movement of the armature-shaft, and therefore of the vehicle. The various connections for coupling the battery-boxes and the fields of the motor in series or in parallel will be more fully described hereinafter in connection with the description of the controller itself.

Figure 8:
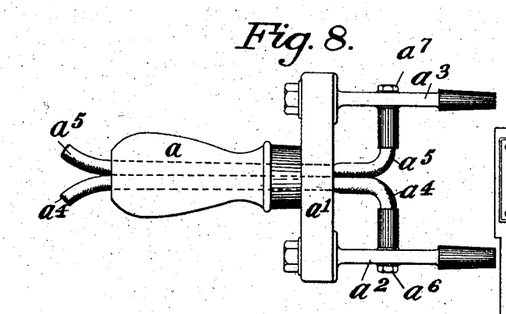
Fig. 8 is a side elevation of the plug for connecting the supply-cable to the storage battery for recharging.
Figure 10:
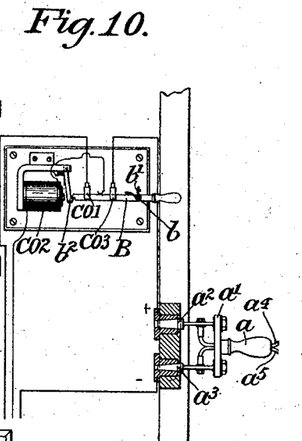
Fig. 10 is a detail view, on a smaller scale than Fig. 9 and partly diagrammatic, to show the relation of the cut-out switch to the charging-plug when the latter is in position and its members in contact with the terminals of the wiring system.

The positive and negative charging-terminals are preferably arranged as presented in Fig. 10, in which they are shown as metallic contact-pieces seated in a shield of insulating material and having each a tapering seat for the reception of the corresponding plug from the supply-cable. The seats are of different diameters, and the corresponding plugs of the cable are likewise of different diameters, so that the positive plug will fit only in the seat of the positive terminal and the negative plug will fit only in the seat of the negative terminal, thereby preventing absolutely any possibility of a wrong connection for recharging. Obviously these plugs might be formed or arranged in any convenient manner, one form being shown clearly in Fig. 8. It consists of handle $a$, of insulating material, to which is secured a bar or blade $a'$, of insulating material, which supports at opposite ends the plugs $a^2$ and $a^3$, the outer ends of said plugs being tapered and of different diameters, as already stated, to fit in the corresponding terminals of the wiring system of the vehicle. The wires from the cable, as $a^4$ and $a^5$, are preferably introduced through the handle $a$, being thoroughly insulated and are attached, respectively, to the plugs $a^2$ and $a^3$, as at $a^6$ and $a^7$.

Figure 9:
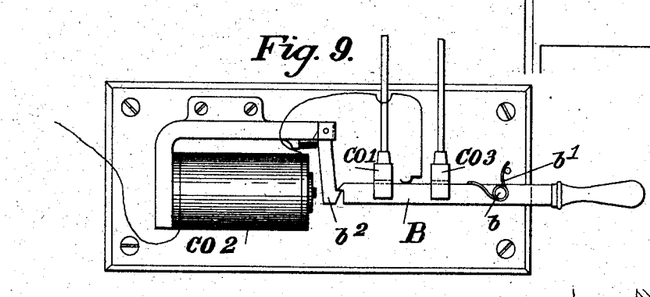
Fig. 9 is a detail view of the automatic cut-out switch for interrupting the supply when the battery is fully charged.

The cut-out switch above referred to may be arranged in many different ways to accomplish the desired purpose, one construction being represented clearly in Fig. 9 and on a smaller scale in Fig. 10. As there represented, the blade B of the knife-switch is pivoted, as at $b$, and is normally pressed in a direction to break the circuit by a suitable spring $b'$. The blade is held in position to connect the two main circuit-contacts CO1 and CO3 by the armature $b^2$ of the magnet included at $CO^2$; but when the magnet is energized by the movement of the indicator of the wattmeter to a point which shows that the battery is fully charged the armature $b^2$ is attracted and the blade B is released to break the circuit between CO1 and CO3, and thereby interrupt the supply of current to the battery, as well as to break the connection between the shunt through CO2 and the main circuit or terminal CO3, which if closed would short-circuit the charging-terminals and might damage parts.

Figure 11:
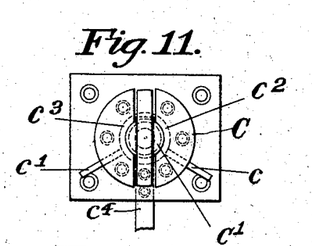
Fig. 11 is a plan view of one form of the emergency or safety switch or cut-out.
Figure 12:
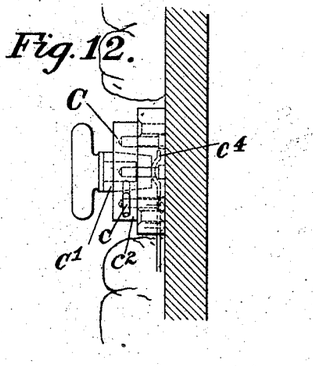
Fig. 12 is an elevation of the same in position on the side of the vehicle-seat.

The emergency-switch heretofore referred to is located at one side of the seat of the vehicle in a convenient position to be controlled by the operator, and its function is to provide for an absolute breaking of the circuit between the battery and the motor in case of any accident, such as a short-circuiting or a breaking down of the controller, and also to render it impossible for any unauthorized person to start the vehicle, the plug of the switch being for this latter reason made bodily removable, it being the intention that the operator shall take it with him if he has occasion to leave the vehicle. A convenient and practical form of emergency-switch is shown at C in Figs. 11 and 12, in which the ends of the wires are brought, as at $c\ c'$, to the respective terminal pieces $c^2\ c^3$, which are separated by a suitable space and form between themselves a seat for the reception of the plug C', which bridges the space between the two terminals $c^2\ c^3$ and completes the circuit, while the removal of the plug absolutely and positively interrupts the circuit between the battery and the motor. When the plug C' is pressed home in its seat, it comes in contact with the terminal $c^4$ of the branch, heretofore referred to, which supplies current to the volt-meter through the points ES1 and ME2.

Figure 2:
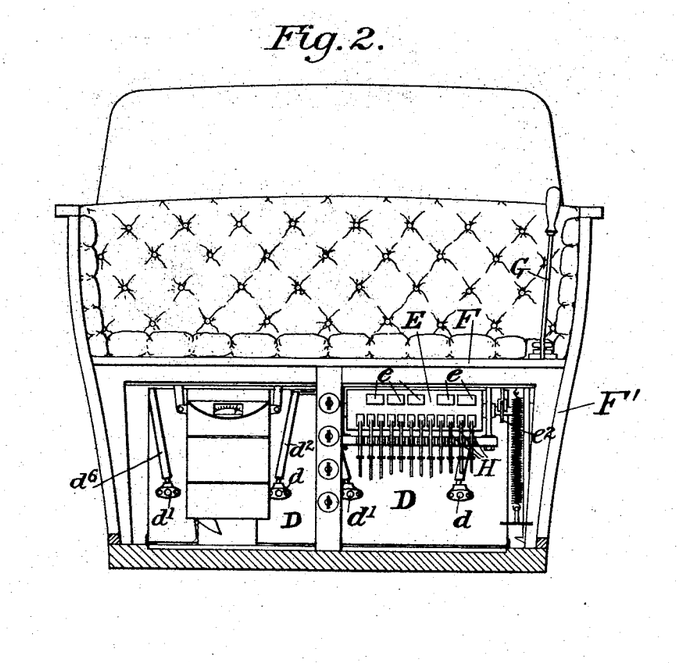
Fig. 2 is a sectional elevation of the vehicle-body in front of the seat or box, showing the ends of two battery-boxes, a recording-watt-meter, switches for lights for various portions of the vehicle, the controller and part of its connections and a portion of the actuating mechanism of the controller, including the actuating-lever in its relation to the seat of the vehicle.
Figure 3:
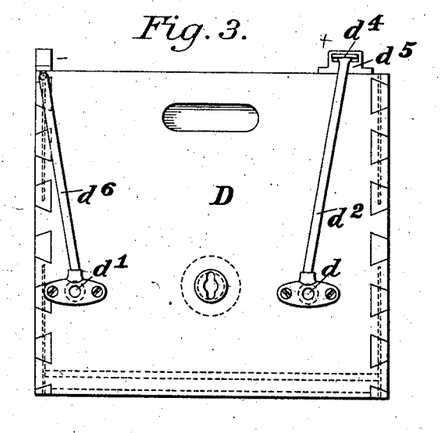
Figs. 3 and 4 are respectively an end elevation and a plan view of one of the battery-boxes, two of the cells being represented as uncovered in Fig. 4.
Figures 4, 5:
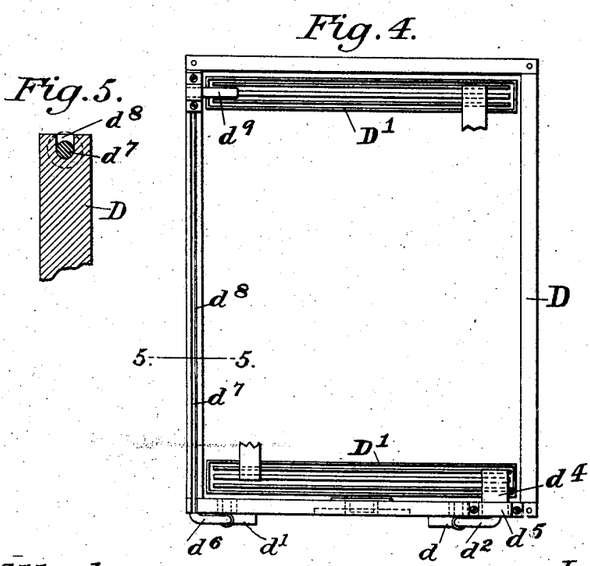
Fig. 5 is a detail section on the line 5 5 of Fig. 4.
Figure 6:
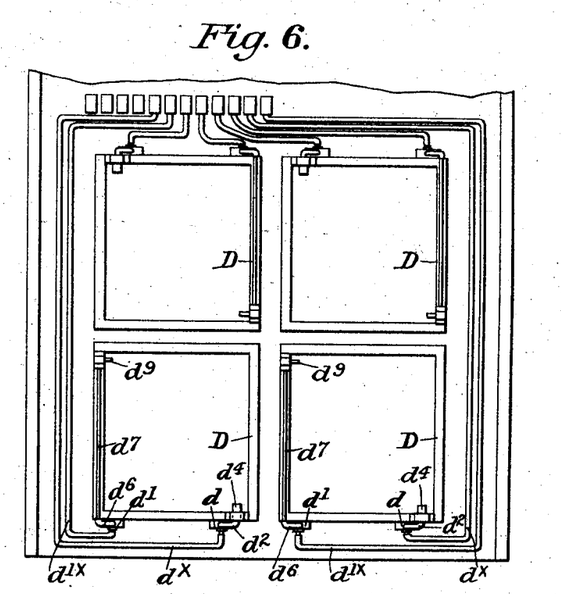
Fig. 6 is a plan view of a portion of the vehicle-body with the storage battery in position thereon to show the connections of the several battery-boxes.
Figure 7:
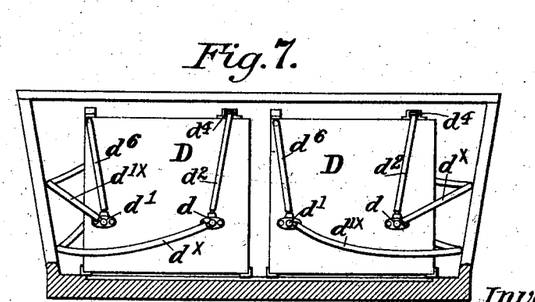
Fig. 7 is a rear end view of the same, the bottom of the vehicle-body being indicated in section.
Figure 13:
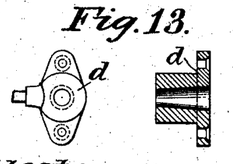
Fig. 13 represents in elevation and longitudinal section one of the terminals of a battery-box.
Figure 14:
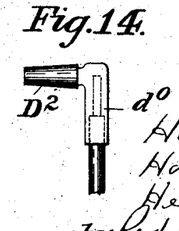
Fig. 14 is a side view of one of the single plugs for making contact with the terminal shown in Fig. 13.

Each battery-box D, as represented in Figs. 2, 3, and 4, is preferably a well-made wooden box with dovetailed joints throughout and adapted to receive the cells D'. The positive and negative terminals $d$ and $d'$, respectively, are substantially alike in construction, consisting, as shown in Fig. 13, of a suitable metallic piece adapted to be secured to the box and having a tapering seat; but the seats in the two terminals are of different diameters, and the two terminals are unsymmetrically disposed with respect to the central plane of the box, one being nearer the edge of the box than the other. The plugs by which the connections between the boxes and the controller are made are represented in general in Fig. 14, the shank $d^0$ being at right angle to the plug member $D^2$, which is tapered to fit the respective terminal and is of a diameter to fit only in the corresponding terminal, so that it is impossible to make a wrong connection. The unsymmetrical relation of the terminals is also an absolutely effective safeguard against improper connections through carelessness in placing the boxes improperly in the body of the wagon, since it is impossible in any manner to bring the terminals of one box into contact with the terminals of another box. As an additional safeguard against improper connections the wires to which the two plugs $D^2$ for the terminals $d$ and $d'$ of each pair are connected are made of unequal length from the fixed points at which they are secured to the vehicle-body, as shown at $d^\times$ and $d'^\times$ in Fig. 7, each wire being of just sufficient length to permit its plug to be inserted readily in the corresponding terminal and it being impossible for the plug with the shorter wire to reach the more remote terminal. The terminal $d$ is connected by a conductor $d^2$ to a contact-plate $d^4$, which is secured to the upper edge of the box, being inserted in a piece $d^5$. From this plate connection is made to the proper element of the adjacent cell. The other terminal, $d'$, is connected similarly by a conductor $d^6$ to a conductor $d^7$, which is sunk in a groove $d^8$ in the upper edge of the corresponding side of the box, so as to diminish the possibility of a short circuit between such connecting-strap and any of the intermediate cells of the box. At its farther end the conductor $d^7$ is connected to a plate at $d^9$, which is secured and protected in the same manner as the plate $d^4$, above referred to.

It will be observed that the use of insulated conductors on the vehicle-body, with flexible ends for connection to the boxes, avoids the danger hitherto existing that the walls, either top, bottom, or side, of the vehicle-body or other inclosure or compartment might be brought into circuit and set on fire.

Figure 17:
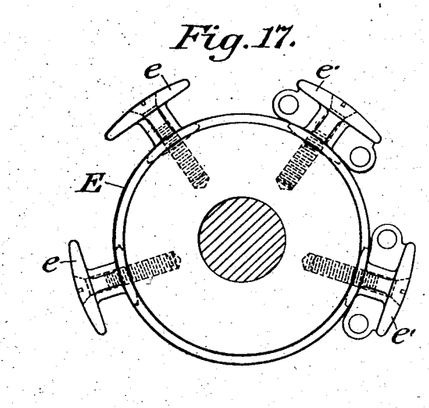
Fig. 17 is a detail view in section, on a larger scale, of the cylinder of the controller to show the contacts thereon.
Figure 18:
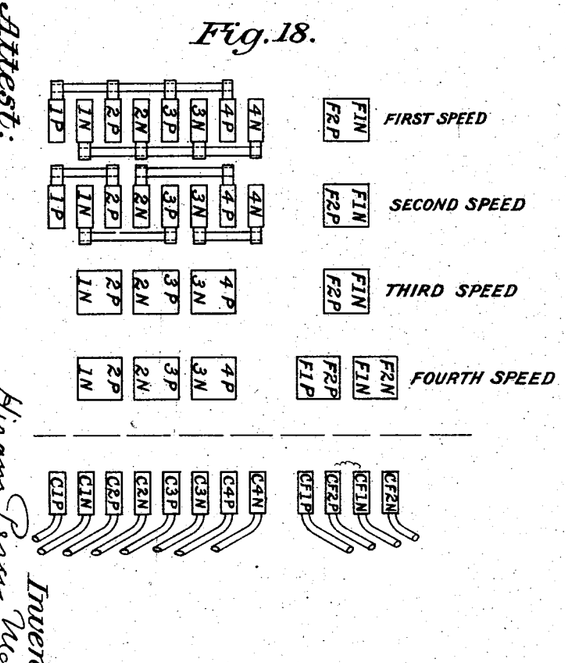
Fig. 18 is a diagrammatic development of the cylinder of the controller to show the relation of the contacts carried thereby to the various terminals, the latter also being indicated.
Figure 19:
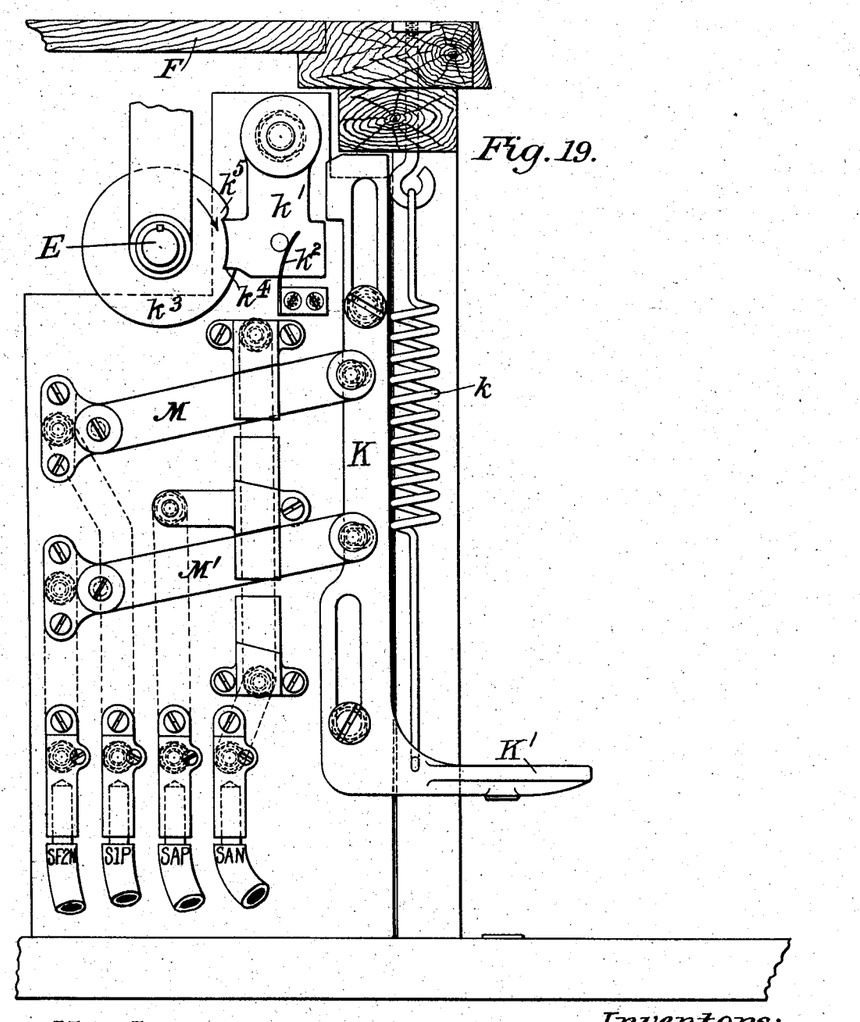
Fig. 19 is a detail view in side elevation of the reversing mechanism.

The controller or device by means of which both the speed and the direction of movement of the motor, and therefore of the vehicle, are regulated by the operator is shown in its preferred relation to the vehicle-body in Fig. 2 of the drawings and in detail in Figs. 15 to 19, being located in the space or compartment, whether completely inclosed or not, beneath the vehicle-seat. It comprises a movable body E, preferably a cylinder or drum, either skeleton or otherwise, with contact-blocks $e\ e$ mounted thereon and connected together in such a manner that in coöperation with the fixed terminals when shifted by the movement or rotation of the body or frame they shall effect the changes of electrical connection necessary for coupling the battery-boxes in parallel or in series or in parallel series and the fields of the motor in parallel or in series, as already alluded to, whereby the speed of the motor may be varied at will. The contacts $e\ e$, as will be observed, are supported above the surface of the cylindrical controller-body and, as clearly shown in Fig. 17, are provided, as may be required, with blocks $e'$ below the contact-head, which may be perforated to support the insulated connecting-wires also above the surface of the cylindrical body, but below the surface of the contacts, whereby two or more sizes of contacts may be kept in stock and readily applied to the cylindrical controller-body, as may be required, together with the necessary connections, all of which may be thoroughly insulated before they are applied to the controller-body. In the construction shown in the drawings the drum E is mounted to rotate in suitable bearings E' E', placed below the seat F of the vehicle, with its outer end in close proximity to the side F' of the vehicle-body, so that the actuating mechanism therefor may also be placed close to the side of the vehicle-body, and therefore not only be in a position very convenient to the operator, but also in such a position that none of its parts shall obstruct the space within the vehicle-body intended for occupancy. As a convenient means for operating the controller its shaft is provided with a pinion $e'$ to be engaged by a gear-segment $g$, which is carried by an arm $g'$, projecting from or secured to the hub $g^2$ of the operating-lever G, which is pivoted near the end of the seat F, so that the path of movement thereof shall be in close proximity to the side or arm of the seat, and therefore shall not interfere with the free occupancy of the vehicle nor with a free entrance to and exit therefrom, although it will be obvious that the lever may be located in any convenient position with respect to the seat. A star-wheel $e^2$ or other similar device is likewise secured to the shaft of the controller-body and is engaged by a roller $e^3$, carried by a spring-pressed arm $e^4$. This device insures the proper movement of the controller at each operation, the position of the notches of the star-wheel corresponding with the positions of the contacts on the controller.

Figures 15, 16, 24:
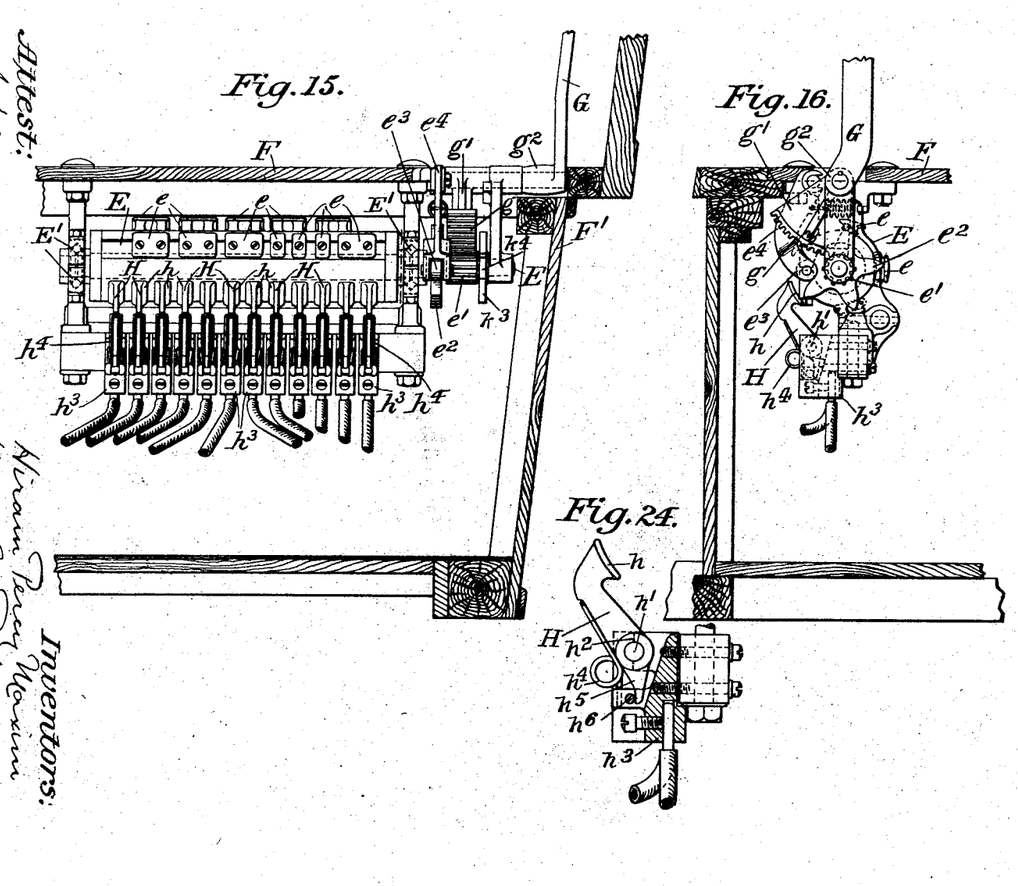
Fig. 15 is a front elevation of the controller and its immediate connections and appurtenances, with the adjacent portions of the vehicle box or seat shown in section, the reversing mechanism being removed.
Fig. 16 is an end view of the same, also with the adjacent portions of the vehicle box or seat in section.
Fig. 24 is a detail end view, partly in section, showing, on a larger scale, one of the terminals of the controller and its supports.

The terminals H H, which coöperate with the contacts $e\ e$, carried by the controller, are so supported as to insure proper contact and also to be readily removable whenever the removal of any one of them becomes necessary. To this end each terminal H is provided with a slightly-concaved shoe $h$ for contact with the controller and, as shown in Fig. 24, with trunnions $h'\ h'$, which are supported in open bearings $h^2\ h^2$ in a metallic block $h^3$, which in turn is secured to and insulated from the frame of the controller. A spring $h^4$ is mounted on the block and bears upon the terminal to press it toward the controller-body, the extent of the movement being limited by a toe $h^5$, which abuts against a stop $h^6$, fixed in the block $h^3$. In this manner the proper capacity for yielding of the terminal is provided for and a perfect contact is secured, while at the same time the terminal can be removed and replaced readily at any time. The proper wire from the battery-box or other part is secured to the block $h^3$ by means of binding-screws or in any other suitable manner.

Should the motor be reversed suddenly while going ahead at full speed, the consequence obviously might be disastrous, and we have therefore provided devices which make it necessary to bring the controller-lever back to the initial or zero position, in which no current is supplied to the motor, before it is possible to operate the reversing-switch to change the direction of movement of the motor and of the vehicle. Such reversing device or switch, which obviously constitutes a part of the controlling means of the vehicle, may be interconnected with the controller in any suitable way to bring about these results, one convenient form of such reversing device being represented in Fig. 19. As there shown, the reversing-switch is operated by the foot, a suitable bar K being mounted to slide at the side of the vehicle-body and having a foot-piece K' for the application of the foot or heel of the operator. This bar is normally held in its highest position by a suitable spring $k$ and has loosely connected thereto the ends of the switch-levers M M', by the shifting of which the direction of the current through the fields and armature of the motor is reversed in a manner well understood and clearly indicated in Fig. 1. In all positions of the controller, except its initial or zero position, the bar K is held from movement by engagement with a dog $k'$, which is pivoted near the bar, and under the influence of a suitable spring $k^2$ bears upon the periphery of a disk $k^3$, secured to the shaft of the controller E. The said disk $k^3$ is formed with a notch $k^4$, which in the initial position of the controller is in line with the end of the dog $k'$ and permits such movement of the dog under the influence of the spring $k^2$ as is sufficient to release the bar K. As soon as the controller E is shifted again from the zero position, the reversing switch-bar K being meanwhile held down by the foot of the operator, the dog $k'$ is pressed back by the inclined end $k^5$ of the notch $k^4$ in the disk $k^3$ over the end of the reversing switch-bar K, thereby preventing a release of said reversing switch-bar until the controller is again brought to the initial or zero position.

It will be observed that the spring always normally brings the reversing-switch back at zero to go-ahead position, so that the driver may be certain always as to the direction in which the vehicle will move and so that he is required to operate the reversing-switch only for the purpose of backing.

In order to enable the action of the controller to be fully understood, the various connections established at each movement of the controller will now be described in detail, reference being had particularly to Figs. 1, 18, 20, 21, 22, and 23 of the drawings, Figs. 15 and 16 showing the controller in its initial or zero position, in which none of the contacts thereof are in electrical connection with the fingers or terminals, and the motor being therefore cut out from the batteries. When the controller-lever is shifted to advance the controller into a position where the first series of contacts thereon are brought into electrical connection with the terminals, the terminals CF2P and CF1N will be connected by the contact at the extreme right in the first group of Fig. 18, thereby connecting the fields of the motor in series. At the same time the eight contacts at the left of said first group, which are connected in alternation to form two groups, as clearly shown, will thereby connect all of the batteries in parallel. This connection of the batteries and the fields, which is represented in Fig. 20, will give the motor the lowest speed. In the second group of contacts the connection of the field remains as before, while by connecting the eight contacts, as clearly shown in the second group of Fig. 18, the four boxes of the battery will be connected in two sets in parallel, with the two boxes in each set in series. The connections are represented in Fig. 21 and will give the second speed to the motor. In the third position of the controller the contacts of the third group of Fig. 18 will connect the fields in series as before and all of the batteries in series also. These connections, which are represented in Fig. 22, will give the third speed to the motor. In the fourth position of the controller the batteries are connected in series, as in the third position, but by the two contacts at the right in the fourth group of Fig. 18 the fields of the motor are connected in parallel, as shown in Fig. 23, which will give the fourth or highest speed to the motor.

The general nature and mode of application as well as the construction and operation of our improvements will be readily understood without further explanation herein. It will also be understood that, especially as to the several mechanical devices, we have merely selected the particular forms shown in the drawings for purposes of explanation. It will also be obvious that the several features of our improvement are not necessarily associated in a single structure, but are capable of use to a greater or less extent independently of each other and in other structures and in other relations than those shown in the drawings.

We claim as our invention—

1. In a motor-vehicle, the combination with a battery, a motor and controller and electrical connections intermediate of the battery and motor and a handle for operating the controller, of a main-line conductor for transmitting electrical energy from the battery to the controller, and a cut-out, independent of the controller, comprising a bodily-movable member constituting a current-carrying portion of the circuit and readily removable to prevent transmission of energy between the battery and the controller.

2. In a motor-vehicle, the combination with a battery, a motor, a controller and electrical connections therefor, of a bodily-removable emergency member interposed in the main circuit, said member constituting a readily-removable current-carrying portion of the main or power circuit of the vehicle.

3. In a motor-vehicle, the combination with a battery, a motor, a controller and electrical connections therefor, of a bodily-removable emergency member interposed in the main circuit between the controller and motor, said member constituting a readily-removable current-carrying portion of the main or power circuit of the vehicle.

4. In combination with a second battery, charging-terminals and connections therefor, and a meter in electrical connection with said battery to indicate the extent to which the battery is charged and having a moving part, of a spring-operated cut-out interposed in the circuit and forming a connection between the battery and charging-terminals, an electromagnet adapted to release the spring-operated cut-out, and a shunt-circuit including the electromagnet and the movable part of the meter whereby the former is energized upon movement of the latter to a predetermined position.

5. In a motor-vehicle, the combination with a body having a compartment adapted to receive storage batteries, of conductors arranged within the body and adjacent to the walls of the compartment and having flexible ends of unequal length and a battery-box having exposed terminals adapted to be coupled to the flexible terminals of the conductors.

6. In a motor-vehicle, the combination with a body having a compartment adapted to receive storage batteries, of conductors arranged within the body and adjacent to the walls of the compartment and having flexible ends with plugs of unequal size, and a battery-box having terminal sockets of unequal size adapted to receive respectively the plugs of unequal size.

7. In a motor-vehicle, the combination with a body having a compartment adapted to receive storage batteries, of conductors arranged within the body and adjacent to the walls of the compartment and having flexible ends of unequal length and terminal plugs of unequal size, and a battery-box having terminal sockets of unequal size adapted to receive respectively the plugs of unequal size.

8. In a motor-vehicle, the combination of a body, battery-boxes supported by said body and having each its terminals unsymmetrically disposed thereon, and connections secured to the body and having loose ends of unequal length.

9. In a motor-vehicle, the combination of a body, battery-boxes supported by said body and having each its socket-terminals, connectors secured to the body and having loose ends, and a plug with a shank secured to each loose end and formed to fit the corresponding socket.

10. A battery-box having the terminals exposed at one end of the box and connected respectively to opposite ends of the series of cells, said box having a groove sunk in one upper edge and the connection between one terminal and the remote end of the series of cells laid in said groove.

11. In a motor-vehicle, the combination of a body, a motor, circuit connections, the terminal portions of said connections being flexible and of unequal length, and a battery-box in said body and having its terminals separated for connection with said terminal portions respectively.

12. In a motor-vehicle, the combination of a body, a battery-box supported by said body and having its terminals separated, a conductor secured to the body and having separated, flexible ends, each flexible end being adapted to reach only its respective terminal on the battery-box.

13. In a motor-vehicle, the combination of a body, a battery-box supported by said body and having its terminals separated, current-carrying means secured to the body and having flexible ends extending from separated points upon the body, each end being adapted to reach only its respective terminal on the battery-box.

14. In a motor-vehicle, the combination of a body, battery-boxes supported by said body and having each its terminal separated, and a plurality of conductors secured to the body and having each separated, flexible ends, the said flexible ends being adapted to reach only the respective terminals on the corresponding battery-box.

15. The combination with a battery and charging-terminals therefor of different sizes, of a handle, two plugs of different sizes secured thereto and corresponding to said terminals, and connections from said plugs to the charging-wires.

16. In a motor-vehicle, the combination with the body, battery and motor, of a controller comprising a rotary body portion and means for rotating it, said body portion bearing a series of contacts, contacts forming the terminals for the battery and motor connections adapted to coöperate with the contacts of the controller, said terminal contacts comprising a pivoted part having trunnions coöperating with blocks having open bearings and springs normally pressing said terminal contacts into operative position to engage the contacts of the controller, whereby said terminals are loosely mounted on and bodily removable from the controller-frame, without removal of other parts.

17. In a motor-vehicle, the combination with the body, battery and motor, of a controller comprising a rotary body portion and means for rotating it, said body portion bearing a series of contacts, the contacts forming the terminals for the battery, and motor connections adapted to coöperate with the contacts of the controller, such terminal contacts comprising a pivoted part, springs normally pressing said terminal contacts into operative position to engage the contacts of the controller, and stops to limit the movement of the terminal contacts.

18. In a motor-vehicle, the combination of a body portion having a seat, and a compartment below the seat, storage batteries and a motor actuated thereby for propelling the vehicle, a controlling device arranged wholly within the compartment and below the seat, an operating-handle for said controlling device projecting through an aperture in the seat, a reversing-switch coöperating with said controlling device to determine the direction of movement of the vehicle, means for operating said switch, and a press or lever projecting from the compartment.

19. In a motor-vehicle, the combination of a body portion having a seat and a compartment below the seat, storage batteries and a motor actuated thereby for propelling the vehicle, a rotary controller-drum arranged within the compartment and below the seat and having an operating-handle pivoted substantially in the plane of the seat and extending beyond it, and a reversing-switch coöperating with said controller to determine the direction of movement of the vehicle, said reversing-switch having a foot-operated lever projecting from the compartment and below the seat.

20. In a motor-vehicle, the combination of a body portion having a seat and a compartment below the seat, storage batteries, and a motor actuated thereby for propelling the vehicle, a controlling device arranged within the compartment and below the seat and having an operating-handle pivoted transversely of the vehicle and projecting upwardly above the plane of the seat and a reversing-switch coöperating with the controlling device to determine the direction of movement of the vehicle, said reversing-switch having an operating-lever located below the level and immediately in front of the seat.

21. In a motor-vehicle, the combination of a body portion, having a seat and a compartment below the seat for storage batteries, a motor actuated thereby for propelling the vehicle, and vehicle-controlling means arranged within the compartment and below the seat and having an operating-handle pivoted transversely of the vehicle and projecting upwardly above the plane of the seat and an electrical reversing device to determine the direction of movement of the vehicle, said reversing device having an operating-lever located below the level and immediately in front of the seat.

22. In a motor-vehicle, the combination of a body portion having a seat and a compartment below the seat, storage batteries and a motor actuated thereby for propelling the vehicle, a controlling device arranged within the compartment and below the seat and having an operating-handle pivoted transversely of the vehicle and projecting upwardly above the plane of the seat, a reversing-switch coöperating with the controlling device to determine the direction of movement of the vehicle, said reversing-switch having an operating-lever located below the level and immediately in front of the seat, and an emergency-switch operable to break the main power-circuit of the vehicle, said switch being located in close proximity to said operating handles or levers.

23. In a motor-vehicle, the combination of a controller having a rotary part adapted by its position to vary the connections between the source of supply and the motor, a reversing-switch coöperating with said controller to determine the direction of movement of the vehicle, said reversing-switch being normally held in a go-ahead position, a pivoted lock interposed between the reversing-switch and the controller-drum adapted to lock the reversing-switch against movement when the controller is in any but a cut-off position, and adapted to permit the reversing-switch to return to its normal position whenever the controller is at its zero or cut-off position.

24. In a motor-vehicle, the combination of a controller having a movable part adapted by its position to vary the supply of current to the motor, a reversing-switch coöperating with said controller to determine the direction of movement of the vehicle, said reversing-switch being normally held in a go-ahead position, a lock interposed between the reversing-switch and the controller adapted to lock the reversing-switch against movement when the controller is in any but a cut-off position, and adapted to permit the reversing-switch to return to its normal position whenever the controller is at its zero or cut-off position.

25. In a motor-vehicle, the combination of vehicle-controlling means comprising a movable part adapted by its position to vary the supply of current to the motor and an electrical reversing device coöperating with the motor to determine the direction of movement of the vehicle and means coöperating with the movable part to throw said device into operative position when the movable part is in a cut-off position.

26. In a motor-vehicle, the combination of vehicle-controlling means comprising a movable part adapted by its position to vary the supply of current to the motor and an electrical reversing device coöperating with the motor to determine the direction of movement of the vehicle, said reversing device being normally held in a go-ahead position, a foot-operated lever to throw said device into operative position, and means whereby such operative position of the reversing device occurs only when the movable part is at a cut-off position.

27. In a motor-vehicle, the combination of a motor and a storage battery for operating it, a controller having a movable part and a handle for operating it, a reversing-switch located adjacent to the controller, a cam mounted upon the rotary part of the controller, a lock interposed between the cam and the reversing-switch and operated by the cam to lock or release the switch, and means for returning the reversing-switch to its go-ahead position when the cam and lock are in their normal positions.

28. In a motor-vehicle, the combination with a motor and a storage battery supplying energy to the motor, of a controller adapted to control the flow of current from the battery to the motor and comprising a drum, contacts mounted upon the drum and secured to its surface, connections between the contacts of the drum and means for retaining said connections beyond the surface of the drum.

29. In a motor-vehicle, the combination with a motor and a source of energy for operating the motor, of a controller adapted to control the flow of energy to the motor, said controller having a rotary supporting-cylinder, contacts mounted upon and secured to the surface of the cylinder, connections intermediate of the contacts and means for retaining said connections above the surface of the cylinder and below the surface of the contacts.

30. The combination with an electric vehicle, having a battery-compartment adapted to receive a storage battery, of charging-terminals for said battery comprising socket members of different sizes, and a charging-plug comprising a handle and a plurality of plugs of different sizes, each insulated from the other and connected with the main-line circuit, said plugs adapted to coöperate with the terminal sockets of corresponding size.

31. The combination with an electric vehicle, of a storage battery and charging-terminals therefor, said terminals comprising sockets of different sizes, and a charging-plug comprising an insulated handle and plugs coöperating with the respective sockets, and electrical connections for the battery-plugs passing through the insulating-handle.

This specification signed and witnessed this 15th day of May, A. D. 1897.

HIRAM PERCY MAXIM.
HARRY M. POPE.
HERBERT W. ALDEN.

In presence of—
ALBERT P. DAY,
HERMANN F. CUNTZ.